United States Patent
Breitenbach et al.

(10) Patent No.: US 6,775,358 B1
(45) Date of Patent: Aug. 10, 2004

(54) METHOD AND SYSTEM FOR ENHANCED INTERACTIVE PLAYBACK OF AUDIO CONTENT TO TELEPHONE CALLERS

(75) Inventors: Stephen Breitenbach, San Diego, CA (US); James Chase, San Clemente, CA (US); Seda Gragossian, Encinitas, CA (US)

(73) Assignee: Oracle Cable, Inc., Redwood Shores, CA (US)

( * ) Notice: Subject to any disclaimer, the term of this patent is extended or adjusted under 35 U.S.C. 154(b) by 448 days.

(21) Appl. No.: 09/860,057

(22) Filed: May 17, 2001

(51) Int. Cl.[7] .............................................. H04M 1/64
(52) U.S. Cl. .................................. 379/88.13; 455/414.1
(58) Field of Search .............................. 379/88.18, 71, 379/72, 73, 76, 88.17, 88.01; 705/14; 704/270.1; 709/249, 318, 319, 227, 229; 455/414.1, 414.2, 414.3; 370/352

(56) References Cited

U.S. PATENT DOCUMENTS

| | | | |
|---|---|---|---|
| 4,945,476 A | 7/1990 | Bodick et al. | 364/413.02 |
| 5,127,043 A | 6/1992 | Hunt et al. | 379/88 |
| 5,146,439 A | 9/1992 | Jachmann et al. | 369/25 |
| 5,187,735 A | 2/1993 | Herrero Garcia et al. | 379/88 |

(List continued on next page.)

OTHER PUBLICATIONS

Siegel, Method and system for utilizing a telephone as a consumer request device for issuing promotions, Jul. 11, 2002, US 2002/0091566.*

Cohen et al, System for and method of creating and browsing a voice web, Nov. 7, 2002, US 2002/0164000.*

Cafarella et al, Method and system for providing interactive telephony sessions, Jul. 25, 2002, US 2002/0099776.*

*Primary Examiner*—Fan Tsang
*Assistant Examiner*—Ming Chow
(74) *Attorney, Agent, or Firm*—Park, Vaughan & Fleming LLP

(57) ABSTRACT

Responsive to an incoming telephone call, a session server consults pre-stored caller preferences to generate a source file of caller-specific audio content, then conducts an interactive playback session audibly presenting the content to the caller. Each call's source file may include an internally stored history record documenting events that occur during playback, such as caller utterances, identity of audio content presented, voice prompts presented to the caller, errors, and time stamps of various playback events. In response to certain caller utterances or completion of the source file's presentation, the session server may reference the history record for guidance in creating an appropriate follow-up source file containing appropriate supplementary audio content. Use may also be made of history records for purposes such as increasing the functionality of interactive user playback, providing billing records, aiding debugging, and preserving data that is useful for marketing purposes.

16 Claims, 11 Drawing Sheets

U.S. PATENT DOCUMENTS

| | | | |
|---|---|---|---|
| 5,243,643 A | 9/1993 | Sattar et al. | 379/88 |
| 5,255,305 A | 10/1993 | Sattar | 379/34 |
| 5,351,276 A | 9/1994 | Doll, Jr. et al. | 379/67 |
| 5,365,574 A | 11/1994 | Hunt et al. | 379/88 |
| 5,379,421 A | 1/1995 | Palazzi, III et al. | 395/600 |
| 5,402,474 A | 3/1995 | Miller et al. | 379/93 |
| 5,454,033 A * | 9/1995 | Hahn et al. | 379/198 |
| 5,509,060 A | 4/1996 | Hall et al. | 379/207 |
| 5,530,852 A | 6/1996 | Meske, Jr. et al. | 395/600 |
| 5,537,586 A | 7/1996 | Amram et al. | 395/600 |
| 5,608,786 A | 3/1997 | Gordon | 379/100 |
| 5,654,886 A | 8/1997 | Zereski, Jr. et al. | 364/420 |
| 5,661,787 A | 8/1997 | Pocock | 379/101.01 |
| 5,761,662 A | 6/1998 | Dasan | 707/10 |
| 5,799,063 A | 8/1998 | Krane | 379/67 |
| 5,802,251 A | 9/1998 | Cohen et al. | 395/284 |
| 5,825,854 A | 10/1998 | Larson et al. | 379/67 |
| 5,915,001 A | 6/1999 | Uppaluru | 379/88.22 |
| 5,970,124 A | 10/1999 | Csaszar et al. | 379/88.18 |
| 6,016,336 A * | 1/2000 | Hanson | 379/88.23 |
| 6,148,063 A * | 11/2000 | Brennan et al. | 379/72 |
| 6,161,127 A * | 12/2000 | Cezar et al. | 709/203 |
| 6,320,948 B1 * | 11/2001 | Heilmann et al. | 379/189 |
| 6,335,962 B1 * | 1/2002 | Ali et al. | 379/88.11 |
| 6,381,324 B1 * | 4/2002 | Shaffer et al. | 379/211.02 |

* cited by examiner

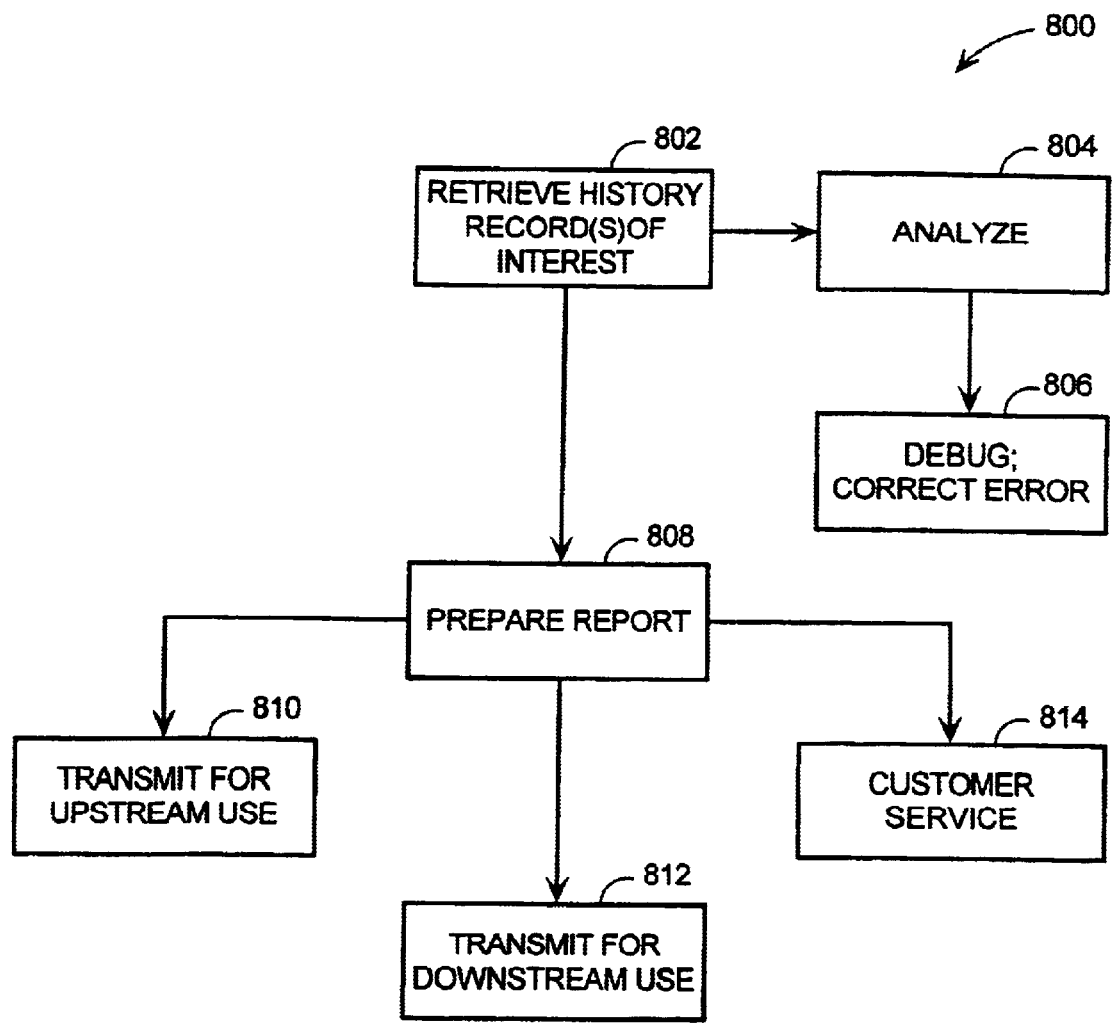

| IF YOU'RE IN: / AND YOU ISSUE: | CONF CHANNEL | CONF CHANNEL HELP | CONF CHANNEL DIALOG | CONF CHANNEL DIALOG HELP | LIST FIRST ITEM | LIST MIDDLE | LIST FINAL ITEM | PAUSE |
|---|---|---|---|---|---|---|---|---|
| | | | | THIS IS WHERE YOU GO | | | | |
| NEXT | NEXT TOPIC | NEXT TOPIC | NEXT TOPIC | NEXT TOPIC | NEXT LIST ITEM | NEXT LIST ITEM | ROLL OFF LIST | NA |
| PREVIOUS | PREVIOUS TOPIC | PREVIOUS TOPIC | PREVIOUS TOPIC | PREVIOUS TOPIC | ROLL OFF LIST | PREVIOUS LIST ITEM | PREVIOUS LIST ITEM | NA |
| NEXT CHANNEL | NEXT CHANNEL | NEXT CHANNEL | NEXT CHANNEL | NEXT CHANNEL | NEXT CHANNEL | NEXT CHANNEL | NEXT CHANNEL | NA |
| PREVIOUS CHANNEL | PREVIOUS CHANNEL | PREVIOUS CHANNEL | PREVIOUS CHANNEL | PREVIOUS CHANNEL | PREVIOUS CHANNEL | PREVIOUS CHANNEL | PREVIOUS CHANNEL | NA |
| PAUSE | PAUSE | PAUSE | PAUSE | PAUSE | PAUSE | PAUSE | PAUSE | NA |
| HELP | CHANNEL HELP | NA | DIALOG HELP | NA | DIALOG HELP | DIALOG HELP | DIALOG HELP | NA |
| GOODBYE | GOODBYE | GOODBYE | GOODBYE | GOODBYE | GOODBYE | GOODBYE | GOODBYE | LAST NON PAUSE |
| RETURN | NA | TOPIC | TOPIC | DIALOG | TOPIC | TOPIC | TOPIC | NA |
| CHANNEL NAME | CHANNEL | CHANNEL | CHANNEL | CHANNEL | CHANNEL | CHANNEL | CHANNEL | NA |
| REPEAT | CURRENT AUDIO FILE | CURRENT AUDIO FILE | CURRENT AUDIO FILE | CURRENT AUDIO FILE | CURRENT AUDIO FILE | CURRENT AUDIO FILE | CURRENT AUDIO FILE | NA |
| TOUCH TONE | NO EFFECT | DTMF HELP | DIALOG'S CHANNEL | DIALOG'S CHANNEL | DIALOG'S CHANNEL | DIALOG'S CHANNEL | DIALOG'S CHANNEL | NA |
| VOICE MODE | NA | NA | NA | NA | NA | NA | NA | NA |
| MENU | NA | NA | NA | NA | NA | NA | NA | NA |
| INDICAST SELECT | INTER-ACTIVE MENU | INTER-ACTIVE MENU | INTER-ACTIVE MENU | INTER-ACTIVE MENU | INTER-ACTIVE MENU | INTER-ACTIVE MENU | INTER-ACTIVE MENU | NA |
| PLAYLIST | NA | NA | NA | NA | NA | NA | NA | NA |

FIGURE 9B

| IF YOU'RE IN: | NON-CONF CHANNEL | NON-CONF CHANNEL HELP | NON-CONF CHANNEL DIALOG | CONTINUED IN FIGURE 9C ----> |
|---|---|---|---|---|
| AND YOU ISSUE: | THIS IS WHERE YOU GO | | | |
| NEXT | NEXT TOPIC IN CHANNEL OR PLAYLIST | NEXT TOPIC IN CHANNEL OR PLAYLIST | NEXT TOPIC IN CHANNEL OR PLAYLIST | 9C ----> |
| PREVIOUS | PREVIOUS TOPIC IN CHANNEL OR PLAYLIST | PREVIOUS TOPIC IN CHANNEL OR PLAYLIST | PREVIOUS TOPIC IN CHANNEL OR PLAYLIST | 9C ----> |
| NEXT CHANNEL | NEXT CHANNEL IN PLAYLIST | NEXT CHANNEL IN PLAYLIST | NEXT CHANNEL IN PLAYLIST | 9C ----> |
| PREVIOUS CHANNEL | PREVIOUS CHANNEL IN PLAYLIST | PREVIOUS CHANNEL IN PLAYLIST | PREVIOUS CHANNEL IN PLAYLIST | 9C ----> |
| PAUSE | PAUSE | PAUSE | PAUSE | 9C ----> |
| HELP | CHANNEL HELP | NA | DIALOG HELP | 9C ----> |
| GOODBYE | GOODBYE | GOODBYE | GOODBYE | 9C ----> |
| RETURN | CURRENT CHANNEL IN PLAYLIST | NON-CONF CHANNEL | NON-CONF CHANNEL | 9C ----> |
| CHANNEL NAME | CHANNEL | CHANNEL | CHANNEL | 9C ----> |
| REPEAT | CURRENT AUDIO FILE | CURRENT AUDIO FILE | CURRENT AUDIO FILE | 9C ----> |
| TOUCH TONE | NO EFFECT | DTMF HELP | DIALOG'S TOPIC | 9C ----> |
| VOICE MODE | NA | NA | NA | 9C ----> |
| MENU | DTMF MENU | DTMF MENU | NA | 9C ----> |
| INDICAST SELECT | INTERACTIVE MENU | INTERACTIVE MENU | INTERACTIVE MENU | 9C ----> |
| PLAYLIST | NA | NA | NA | 9C ----> |

FIGURE 9C

| CONTINUED FROM 9B | NON-CONF CHANNEL DIALOG HELP | DTMF MENU | DTMF HELP |
|---|---|---|---|
| 9B ---> | | THIS IS WHERE YOU GO | |
| 9B ---> | NEXT TOPIC IN CHANNEL OR PLAYLIST | NEXT TOPIC IN CHANNEL OR PLAYLIST | NEXT TOPIC IN CHANNEL OR PLAYLIST |
| 9B ---> | PREVIOUS TOPIC IN CHANNEL OR PLAYLIST | PREVIOUS TOPIC IN CHANNEL OR PLAYLIST | PREVIOUS TOPIC IN CHANNEL OR PLAYLIST |
| 9B ---> | NEXT CHANNEL IN PLAYLIST | NEXT CHANNEL IN PLAYLIST | NEXT CHANNEL IN PLAYLIST |
| 9B ---> | PREVIOUS CHANNEL IN PLAYLIST | PREVIOUS CHANNEL IN PLAYLIST | PREVIOUS CHANNEL IN PLAYLIST |
| 9B ---> | PAUSE | PAUSE | PAUSE |
| 9B ---> | NA | DTMF HELP | NA |
| 9B ---> | GOODBYE | NA | NA |
| 9B ---> | NON-CONF CHANNEL DIALOG | NA | NA |
| 9B ---> | CHANNEL | CHANNEL | NA |
| 9B ---> | CURRENT AUDIO FILE | NA | NA |
| 9B ---> | DIALOG'S TOPIC | NA | NA |
| 9B ---> | NA | NO EFFECT | NA |
| 9B ---> | NA | NA | DTMF MENU |
| 9B ---> | INTERACTIVE MENU | NA | NA |
| 9B ---> | NA | NA | NA |

FIGURE 9D

| IF YOU'RE IN: | INTERACTIVE MENU | INTERACTIVE MENU HELP | INTERACTIVE CHANNEL | INTERACTIVE CHANNEL HELP |
|---|---|---|---|---|
| AND YOU ISSUE: | THIS IS WHERE YOU GO | | | |
| NEXT | NA | INTERACTIVE MENU | INFORMATION REPROMPT | INTERACTIVE CHANNEL |
| PREVIOUS | NA | INTERACTIVE MENU | INFORMATION REPROMPT | INTERACTIVE CHANNEL |
| NEXT CHANNEL | NA | INTERACTIVE MENU | INTERACTIVE MENU | INTERACTIVE MENU |
| PREVIOUS CHANNEL | NA | INTERACTIVE MENU | INTERACTIVE MENU | INTERACTIVE MENU |
| PAUSE | PAUSE | PAUSE | PAUSE | PAUSE |
| HELP | INTERACTIVE HELP MENU | NA | INTERACTIVE CHANNEL HELP | NA |
| GOODBYE | GOODBYE | GOODBYE | GOODBYE | GOODBYE |
| RETURN | NA | INTERACTIVE MENU | INTERACTIVE MENU | INTERACTIVE CHANNEL |
| CHANNEL NAME | CHANNEL | CHANNEL | CHANNEL | CHANNEL |
| REPEAT | CURRENT AUDIO FILE | CURRENT AUDIO FILE | CURRENT AUDIO FILE | CURRENT AUDIO FILE |
| TOUCH TONE | NA | NA | NA | NA |
| VOICE MODE | NA | NA | NA | NA |
| MENU | NA | INTERACTIVE MENU | INTERACTIVE MENU | INTERACTIVE MENU |
| INDICAST SELECT | NA | NA | NA | NA |
| PLAYLIST | BEGINNING OF PLAYLIST | BEGINNING OF PLAYLIST | BEGINNING OF PLAYLIST | BEGINNING OF PLAYLIST |

METHOD AND SYSTEM FOR ENHANCED INTERACTIVE PLAYBACK OF AUDIO CONTENT TO TELEPHONE CALLERS

BACKGROUND OF THE INVENTION

1. Field of the Invention

The present invention relates a system that responds to incoming telephone calls by dynamically generating a source file of caller-specific audio content, and then utilizing the source file to conduct an interactive playback session audibly presenting the audio content to the caller. The invention supplements source files with internally stored history records for purposes such as increasing the functionality of interactive user playback, providing billing records, aiding debugging, and preserving data that is useful for marketing purposes.

2. Description of the Related Art

VoiceXML is a markup language for representing human-computer dialogs, analogous to the hypertext markup language (HTML). Unlike HTML, which utilizes a graphical web browser, with display, keyboard, and mouse, VoiceXML utilizes a voice browser with audio output (computer-synthesized and/or recorded), and audio input (voice and/or keypad tones). The typical VoiceXML voice browser runs on a specialized voice gateway node that is connected both to the public switched telephone network (PSTN) and to the Internet. These voice gateways extend the power of the worldwide web to telephones of all sorts, from traditional land line phones to wireless or even satellite phones.

VoiceXML is particularly suited to a number of different technologies. One example pertains to information retrieval applications. Here, output tends to be pre-recorded information, and voice input often consists of a few navigation commands and limited data entry (e.g., a few commands to browse a set of news articles, or the collection of zip code for a weather forecast). One approach is a system in which users enroll for a voice newsletter at a web site and specify their interests, and then call in periodically to listen to their newsletter and browse through its articles. Information retrieval applications can provide general or more specialized information (e.g., intranet-based company news), and may be funded by subscription, advertisement, connect time, etc.

Another area suitable for VoiceXML is electronic commerce. Catalog ordering applications may be implemented if the customer has a printed catalog, or knows the exact product already, or if the products can be described briefly and there is a small number of them. Customer service applications such as package tracking, account status, and call centers are well suited to VoiceXML. Financial applications such as banking, stock quotes and trading are also well suited to VoiceXML.

Some other areas that are ripe for VoiceXML include (1) telephone services such as personal voice dialing, one-number "find-me" services, teleconference room setup and management, (2) intranet applications such as inventory control, ordering supplies, providing human resource services, and corporate portals, and (3) unified messaging applications such as e-mail, voice-oriented address information, origination or routing of pager messages, and (4) many others. Further information about VoiceXML is available from the VoiceXML Forum, a program of the IEEE Industry Standards and Technology Organization (IEEE-ISTO), and may be found at the internet address http://www.voicexml.org.

Although VoiceXML and its known applications provide numerous benefits today, INDICAST CORPORATION ("INDICAST") has sought improvements in the performance and efficiency of traditional audio content rendering. Relatedly, INDICAST is the assignee of co-pending U.S. patent application Ser. No. 09/653,472, filed on Aug. 31, 2000 in the names of T. Todd Elvins et al. and entitled "SYSTEM AND METHOD FOR GATHERING, PERSONALIZED RENDERING, AND SECURE TELEPHONIC TRANSMISSION OF AUDIO DATA." The entirety of the foregoing application is hereby incorporated herein by reference. Nonetheless, the present inventors have encountered a number of limitations of VoiceXML when applied to more intensive tasks involving the rendering of audio content to telephone callers. Still, extending the VoiceXML language would require a large software development effort and any deviation from the VoiceXML standard would make such a solution non-portable.

Consequently, the state of the art is not completely adequate due to certain unsolved problems.

SUMMARY OF THE INVENTION

Responsive to an incoming telephone call, a session server first consults pre-stored caller preferences to generate a source file of caller-specific audio content, and then proceeds to conduct an interactive playback session audibly presenting the audio content to the caller. An exemplary source file is a VoiceXML file containing and/or referencing the audio content. Each call's source file includes an internally stored history record documenting events that occur during playback, such as caller utterances, identity of audio content presented, voice prompts presented to the caller, errors, and time stamps of various playback events. In response to certain caller utterances or completion of the source file's presentation, the session server may reference the history record to create an appropriate follow-up source file containing supplementary audio content. The history records may be used to increase the functionality of interactive user playback, generate billing records based on content play time, aid in debugging efforts, preserve data indicative of customer tastes for marketing purposes, and other uses.

The foregoing features may be implemented in a number of different forms. For example, the invention may be implemented to provide a method of enhanced interactive playback of audio content to telephone callers according to pre-selected caller preferences, as described herein. In another embodiment, the invention may be implemented to provide an apparatus such as an audio information delivery system, as discussed herein. In still another embodiment, the invention may be implemented to provide a signal-bearing medium tangibly embodying a program of machine-readable instructions executable by a digital data processing apparatus to perform enhanced interactive playback as described herein. Another embodiment concerns logic circuitry having multiple interconnected electrically conductive elements configured to perform enhanced interactive playback as described herein.

The invention affords its users with a number of distinct advantages. Unlike VoiceXML and other known languages, the present invention creates a log representing playback, input, and error events. This log, the history record, is useful in many different ways. For example, by using a history record to maintain state across phone calls, the audio information delivery system of the invention carefully tailors playback services to each particular caller's interactive playback use-history. For instance, history records enable the audio delivery system to resume dropped calls from the point where playback ended, without the need for unnecessary, time-consuming interaction with the caller to regain perspective. Along these lines, when a new call is received, the audio information delivery system may use history records to skip over content played for the caller during previous playback sessions. As another advantage, the invention uses its history record feature to record play time, which is subsequently helpful for billing purposes, such as tracking play time for payment of content providers, or tracking play time for billing callers for their use of playback services. History records may also be used for data mining, recreating calls to debug software, conducting user studies, and the like. Moreover, the invention provides a voice-user interface that is user-friendly in several respects. For instance, the invention's use of history records accommodates playback re-ordering responsive to users' commands such as back-up, previous channel, next channel, etc. The invention also provides a number of other advantages and benefits, which should be apparent from the following description of the invention.

BRIEF DESCRIPTION OF THE DRAWINGS

FIG. 8 is a flowchart showing operations to illustrate various uses of history records according to the invention.

FIGS. 9A–9D depict an array of functions 900 according to one embodiment of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Audio Information Delivery System: Introduction

Figure 1:
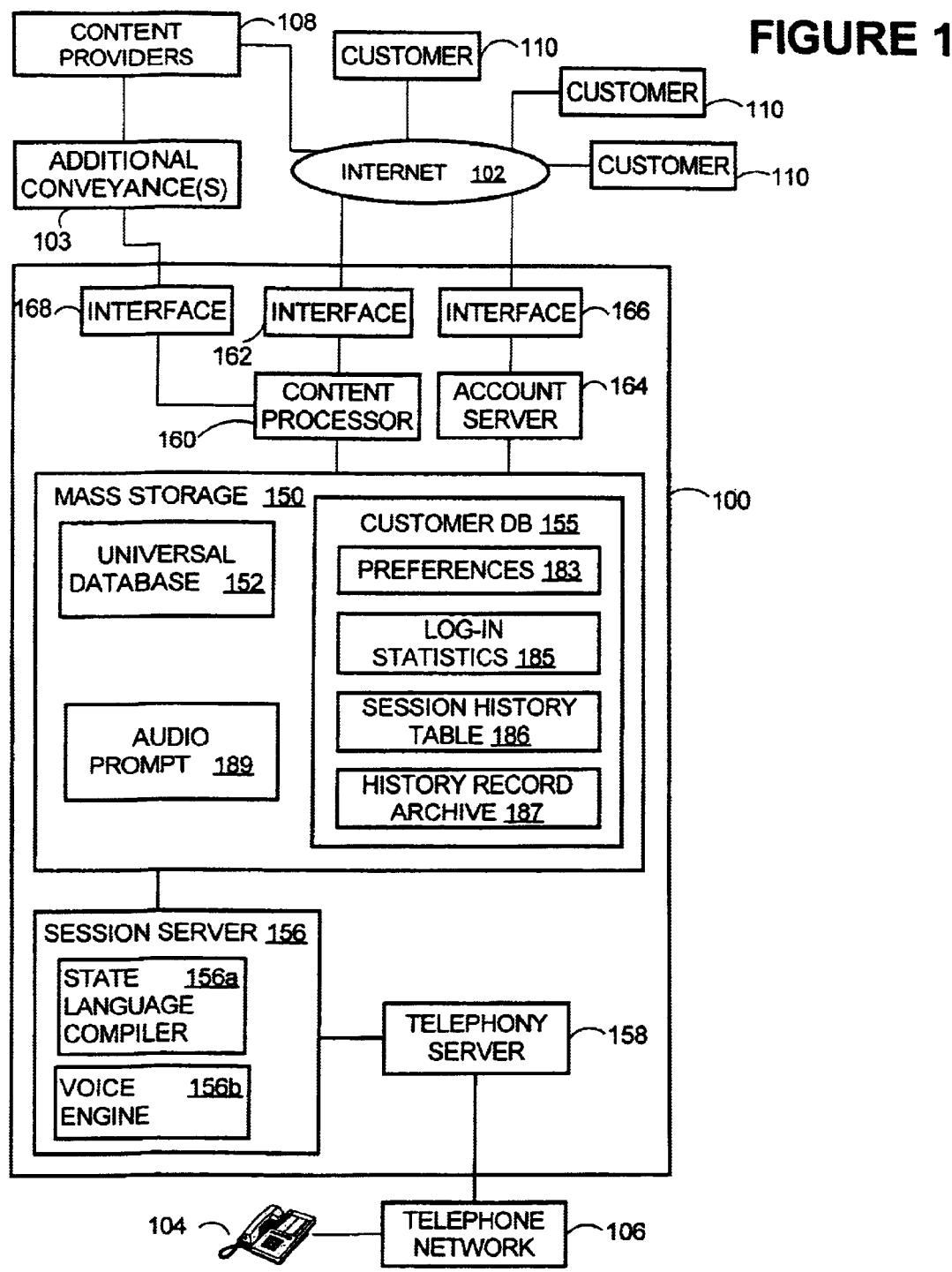
FIG. 1 is a block diagram of the hardware components and interconnections of an audio information delivery system according to the invention.

One aspect of the invention concerns an audio information delivery system, which may be embodied by various hardware components and interconnections. FIG. 1 describes one example in the form of the audio information delivery system 100, which is illustrated in the context of various other peripheral components external to the system 100. Broadly, the system 100 is operated by an "information delivery agency" and serves to continually collect electronic data from the content providers 108 via the Internet 102 and/or additional conveyances 103. Responsive to customer inquiries, the system 100 selectively retrieves data from local stores in areas of interest to the inquiring customers, formats the data, and transmits the data in audio form to the callers' telephones 104 via telephone networks such as 106. As explained below, the system 100 can rapidly convey information to customers because the underlying data are pre-collected, and because there is a high speed, non-Internet connection between the system 100 and the customer's telephone 104. In this sense, the system 100 exhibits a "minimum latency architecture."

Content Providers

Referring to FIG. 1 in greater detail, the content providers 108 are computer-equipped suppliers of electronic information in various subject areas. In some cases, the content providers 108 may be underlying sources of data, such as magazine or newspaper publishers, content syndicators, or radio producers. Some specific examples include Reuters™ news service, the New York Times™ newspaper, Time™ magazine, ABC News™, etc. In other cases, the content providers 108 may be entities that relay and/or possibly assemble information generated by others, one example being Lexis-Nexis™.

Customers

In addition to the content providers 108, the system 100 also interacts with customers 110. Certain aspects of this interaction occur over the Internet 102, with the customers 110 using personal computers, web-TV units, web-enabled phones, personal information devices, and other electronic internet access devices (referred to collectively as "personal computers"). As shown below, customers 110 communicate with the system 100 from their personal computers in order to establish various customer "preferences" for future "playback" sessions in which they receive audio information from the system 100.

Conveyances

The system 100 gathers information from the content providers 108 and the customers 110 through various conveyances, including the public Internet 102 as well as any additional conveyances 103. The additional conveyances 103 may include news wire, satellite feed, cable, stock ticker, e-mail, dedicated telephone line, dial-up connection, or any other medium suitable for transmission of electronic information as discussed herein. Accordingly, the system 100 includes network cards, modems, intelligent channels, radio transceivers, or other suitable devices to implement interfaces 168, 162, 166, enabling components of the system 100 to interact with the Internet 102 and the conveyances 103. The system 100 may also receive data that is manually entered by staff of the information delivery agency after retrieval from the content providers 108 via automated means or manual conveyances such as postal delivery, courier, overnight mail, fax machine, etc.

Content Processor

Within the system 100, the content processor 160 gathers information from the content providers 108. Such gathering may include actively obtaining information, passively receiving data, a combination of both, etc. As explained below, the content processor 160 continually gathers information in predefined areas, irrespective of the customers' preferences. The content processor 160 stores the gathered data in a universal database 152 contained in mass storage 150. To provide one illustrative example, the content processor 160 may be implemented with one or more personal computers, servers, workstations, mainframe computers, etc.

Mass Storage

Although the mass storage 150 may be configured in a variety of ways according to this invention, one example includes a universal database 152 implemented in a network-attached storage device such as a NetApp F700 model Network Appliance brand filer. To minimize the number of concurrent connections and thereby conserve the costs required to operate the database 152, especially large files (such as audio data) may be stored in one particular area of the database 152. For instance, a data file may be identified in one area of the database 152 by storage path and filename, with the actual file contents being stored in a different area of the database 152 structure. For this reason, components such as the session server 156 and telephony server 158 (described below) may access the file contents without invoking both areas of the database 152 structure, thereby improving operating efficiency.

As illustrated, the storage 150 also includes a customer database 155. As shown below, the customer database 155 contains information regarding each customer's identity, account data, preferences, etc. Particularly, the customer database 155 contains preferences 183, log-in statistics 185, session history table 186, and history record archive 187. As shown below in greater detail, the preferences 183 include each customer's preferred content and order for audio playback. The log-in statistics 185 include information uniquely identifying each customer, along with personal identification numbers and other appropriate codes. The session history table 186, also called the "who-heard-what-table," contains records about customers' previous call histories. For instance, the table 186 lists the content topics that the system 100 has previously played for each customer. The history record archive 187 stores history records from past calls for various uses as discussed herein. Customer data in the preferences 183, log-in statistics 185, and session history table 186, and history record archive 187 may be indexed by User-IDs as fully explained below.

The storage 150 also includes a number of pre-prepared audio prompts 189. As one example, the prompts 189 may include fixed voice prompts such as "Say your ten digit phone number," "I didn't get that," "Say your four digit pin number," music clips, and the like. The prompts 189 may also include "ear-cons" (audio icons), which comprise brief audio sounds such as a cash register noise, trumpet horn, thunder clap, and the like.

Account Server

The account server 164 interacts with customers 110, assisting them in preference choice, account setup, etc. Chiefly, the account server 164 interacts with customers' personal computers via the Internet 102, guiding customers through the process of establishing and later reconfiguring their customer accounts. In this respect, one particularly useful implementation of the account server 164 is a worldwide web server, which presents an interactive "web" page. The account server 164 may also receive account setup/reconfiguration data from other sources, such as web-enabled phones, computers with direct dial-ups, or human agents of the information delivery agency that take the customer's data over the telephone, facsimile, e-mail, postal service, etc. To provide one illustrative example, the account server 164 may be implemented with one or more personal computers, servers, workstations, mainframe computers, etc.

The account server 164 maintains customer data in the customer database 155, which is shown as part of the storage 150 to illustrate one example of efficient storage use. Alternatively, the account server 164 may utilize a different source of storage, such as its own hard disk drive, a separate external storage device, remote storage, etc.

Session Server and Other Components

In contrast to the information gathering and account setup services of the content processor 160 and account server 164, the session server 156 responds to incoming calls from enrolled customers and provides them with selected information from the mass storage 150 according to the individual customers' preferences previously defined through the account server 164. The session server 156 may also provide limited services to non-customers under a guest mode. The content rendering process is described in greater detail below. To provide one illustrative example, the session server 156 may be implemented with one or more personal computers, servers, computer workstations, mainframe computers, etc.

As illustrated, the session server 156 includes a state language compiler 156a and a voice engine 156b. As explained in greater detail below, the state language compiler 156a functions to analyze customers' history records to determine how to process the customer's call via VoiceXML. The state language compiler 156a compiles state language into actions for the voice engine 156b, and may comprise a "C" language program compiled based on LEX/YACC, as one example. One advantage of using the state compiler 156a is that it avoids the need to write programming code with many nested "IF" statements, and the attendant delay and complexity of running such programs. The voice engine 156b, using information including output from the state language compiler 156a, retrieves appropriate content from the database 152 and formats the content for transmission to the caller via the telephony server 158. Operation of the voice engine 156b is discussed in greater detail below.

Specific functions of the state language compiler 156a and voice engine 156b are illustrated in the context of these components, whereas general computing or management functions that are not particular to components 156a–156b are discussed more broadly in terms of the "session server 156" itself.

The session server 156 interacts with a telephony server 158, which comprises a telephone interface component that connects the other components of the system to the PSTN. Accordingly, one example of the telephony server 158 is a Dialogic brand line interface card, such as a D240SCT1 voice card installed in an Intel-processor-based personal computer. To accommodate many concurrent incoming calls, the telephony server 158 may include switching equipment to load-balance calls across a farm of telephony servers.

Telephone networks such as 106 enable customers to access the telephony and session servers 156,158 from their telephones 104. In the case of wireless telephones, one embodiment of the telephone network 106 comprises a suitable cellular network and the infrastructure of the PSTN and long distance network(s) necessary to complete customers' calls to the telephony server 158. For customers calling from land line phones, the telephone network 106 includes the applicable PSTN and long distance network(s) needed to complete the customer's call.

Exemplary Digital Data Processing Apparatus

The computer-based processors and servers of the invention may be implemented with various hardware components and interconnections. For example, each of the components 160, 164, 156, and 158 may be implemented with a separate digital data processing apparatus. Alternatively, some or all of these components may be consolidated by implementation of a single, albeit more powerful, digital data processor.

Figure 2:
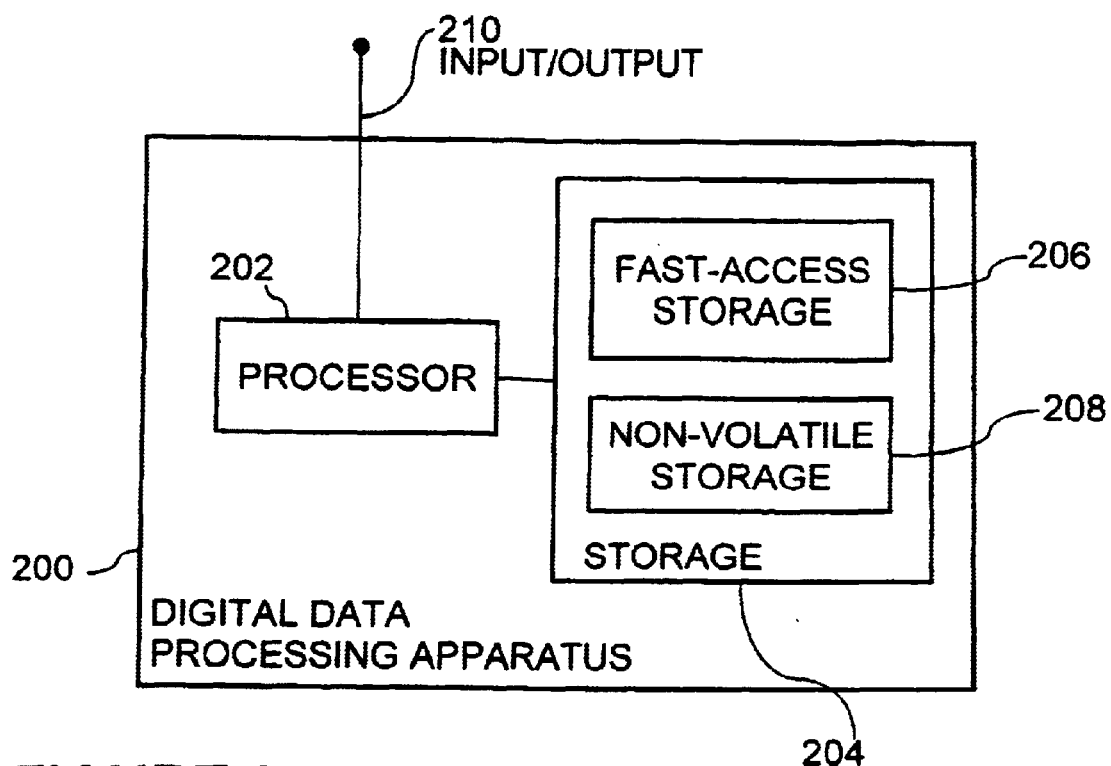
FIG. 2 is a block diagram of a digital data processing machine according to the invention.

In either case, FIG. 2 depicts an exemplary digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, some or all of the components 160, 164, 156, 158 may use logic circuitry instead of computer-executed instructions. Depending upon the particular requirements of the application in the areas of speed, expense, tooling costs, and the like, this logic may be implemented by constructing application-specific integrated circuits ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

Having described the structural features of the present invention, the method aspect of the present invention will now be described. Although the present invention has broad applicability to the delivery of audio information services, the ensuing description is particularly suited to the specifics of the structure that has been described above, and the explanation that follows will emphasize such an application of the invention without any intended limitation. The method aspect of this invention collects electronic data via Internet or other conveyance, and responsive to customer inquiries, selectively retrieves data from local stores in areas of interest to the inquiring customers, and renders the data in audio form to customers via their telephones. As shown below, the invention also creates and utilizes history records for purposes such as increasing the functionality of interactive user playback, providing billing records, aiding debugging, and preserving data that is useful for marketing purposes.

Signal-Bearing Media

In the context of FIG. 1, such a method may be implemented, for example, by operating the system 100, as embodied by one or more digital data processing apparatuses 200, to execute respective sequences of machine-readable instructions. These instructions may reside in various types of signal-bearing media. In this respect, one aspect of the present invention concerns a programmed product, comprising signal-bearing media tangibly embodying a program of machine-readable instructions executable by components such as 160, 164, 156, 158 to perform their relative functions as described below.

Figure 3:
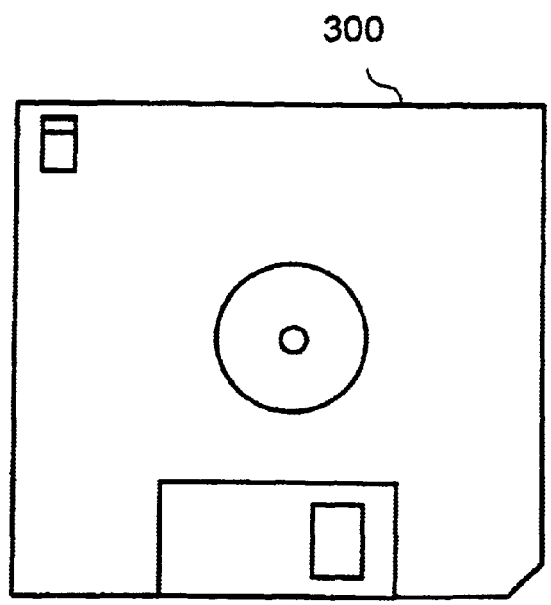
FIG. 3 shows an exemplary signal-bearing medium according to the invention.

As one option, this signal-bearing media may comprise, for example, RAM (not shown) contained within appropriate sites of the system 100. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, certain aspects of the invention may be implemented using logic circuitry, instead of using a processor to execute instructions. In this embodiment, the logic circuitry is used to implement one or more of the components 160, 164, 156, 158 according to the method of the invention. The logic circuitry may be implemented using many different types of circuitry, as discussed above.

Obtaining Information from Content Providers

Figure 4:
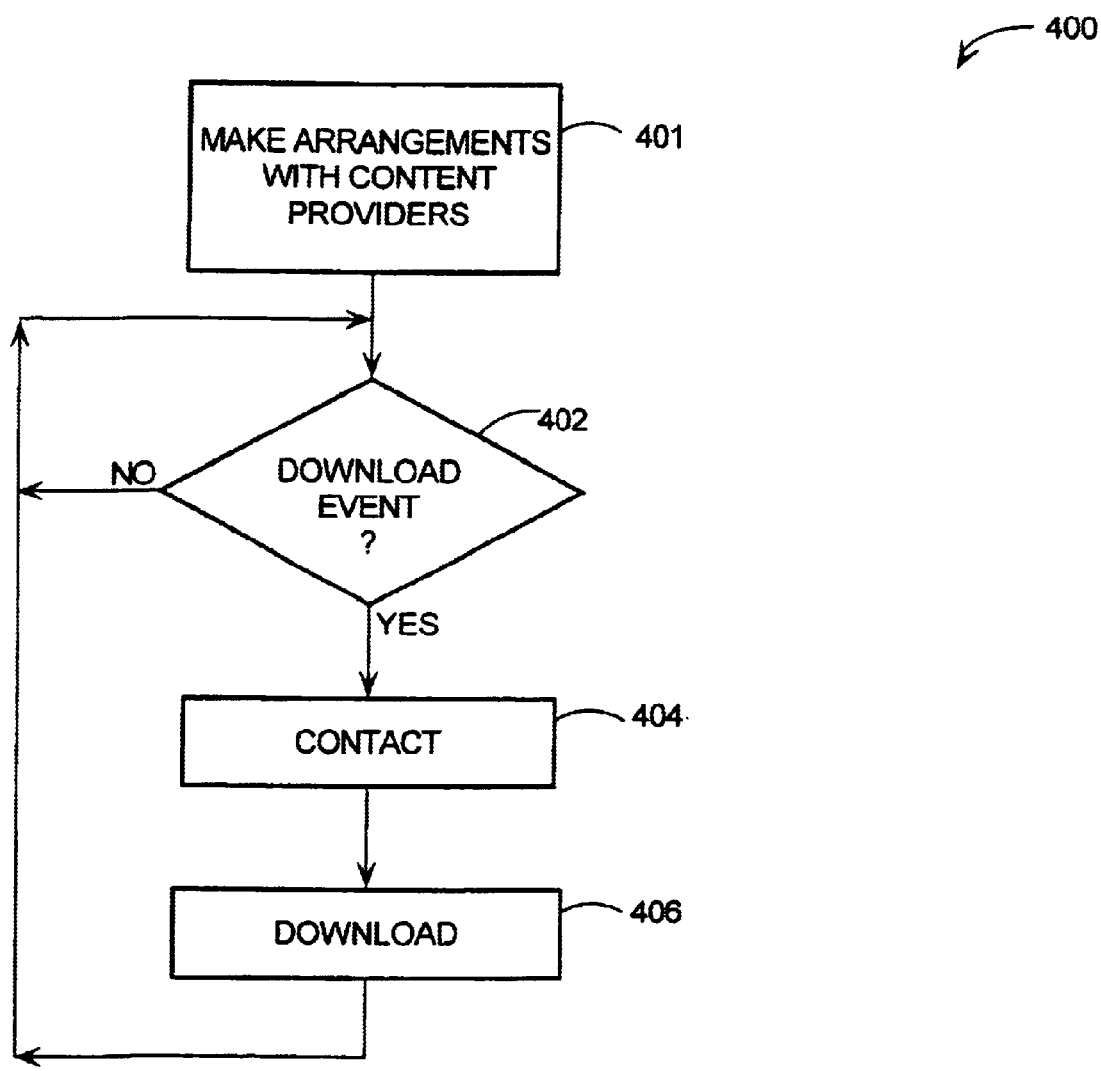
FIG. 4 is a flowchart of an operational sequence for obtaining information from content providers, according to the invention.

To begin illustrating the method aspect of this invention, FIG. 4 shows a sequence 400 that illustrates operations performed by the system 100 to obtain information from the content providers 108. In subsequent playback sessions (described below), this downloaded information is reformatted and presented to customers in audio form over their telephones.

For ease of explanation, but without any intended limitation, the example of FIG. 4 is described in the context of the hardware environment of FIG. 1, as described above. In step 401, the information delivery agency that manages the system 100 makes financial or other suitable arrangements for obtaining information from content providers 108. This may involve subscribing to on-line, wire, satellite, or other information services, for example. According to the present invention, the information delivery agency selects content providers with data that is particularly suitable for audio playback to telephone callers. Thus, the arrangements of step 401 may even involve agreements requiring certain content providers to supply underlying data that is suitable for replaying to telephone callers, such as (1) digital audio files in WAV, VOX, AUD, MP3, RA, PCM, or other format or protocol, (2) text stories in suitable brevity, content, detail, and other format for rendering in audio form to cellular or other customers, or (3) other types of data.

The arrangements of step 401 may also specify the type of information to be downloaded from each content provider. As explained in greater detail below, the content processor 160 seeks to repeatedly download information in several predefined areas of subject matter, called "channels."

Data under some channels may be downloaded from certain content providers, with data of other channels being downloaded from different content providers.

Arrangements having been made, step 402 waits for a "download event" to occur. Occurrence of a download event at the content processor 160 or at a content provider 108 triggers downloading information from a content provider 108 to the content processor 160. Download events may occur periodically, randomly, on a non-periodic schedule, or another basis.

At the content processor 160, for example, a download event may constitute a self-scheduled reminder to start downloading information from one or more content providers particular to that reminder. These reminders may be scheduled periodically (such as every hour, day, etc.), randomly, non-periodically (e.g., whenever a news alert is received), or according to another desired schedule. Downloading may occur more frequently for time critical data (such as stock market updates, traffic reports, etc.) and less often for static or preset data (such as television programming, etc.). Moreover, download events may occur on different schedules for different "channels" (as discussed below), such as continual updates for traffic reports, daily updates for sports scores, and monthly updates for television programming. Furthermore, downloading may occur continuously for especially voluminous or time-sensitive information, such as sports scores occurring over a sports score ticker feed.

Download events may be initiated by the content providers 108 as well, such as when a content provider self-initiates data transfer to the content processor 160 according to its own schedule. Such a schedule may, for example, be periodic, random, non-periodic, or another schedule which might or might not be prearranged with the information delivery agency. As an example, a content provider 108 may experience a download event whenever it accumulates more than a certain amount of information, or whenever a news story breaks.

In step 404, contact is initiated between the content processor 160 and the content provider(s) 108 related to the download event. In the case of a download event at the content processor 160, contact in step 404 is initiated by the content processor 160. For instance, the content processor 160 may initiate contact (step 404) with the content provider 108 in order to request that content provider 108 to start downloading data, engage in handshaking or other tasks related to establishing communications, etc. In the case of a download event at the content provider 108, contact in step 404 is initiated by that content provider 108.

In step 406, the information download occurs. In this operation, the content provider 108 transmits (and the content processor 160 receives) data. In the illustrated example, downloading is performed independent of any individual customer's preferences, and therefore constitutes a "universal" download. If desired, downloading may be driven according to customer preferences in an alternative implementation.

The content of downloaded data is further explained as follows. Namely, the different preset areas of subject matter to be downloaded are referred to as "channels," and the pre-arranged information in these channels is downloaded repeatedly independent of individual customers' preferences (i.e., "universally"). Each download (step 406) may involve one or multiple channels, depending upon the nature of the download event. With repeated performance of step 406, the content processor 160 maintains a desired level of currency of data in the subject matter of each channel. In the present example, the content processor 160 downloads information area in the following channels:

Channel 1—Traffic
Channel 2—News
Channel 3—Financial Ticker
Channel 4—Entertainment
Channel 5—Sports
Channel 6—Weather
Channel 7—Horoscope After each performance of step 406, control returns to step 402 to await the next download event.

Account Setup/Change

Figure 5:
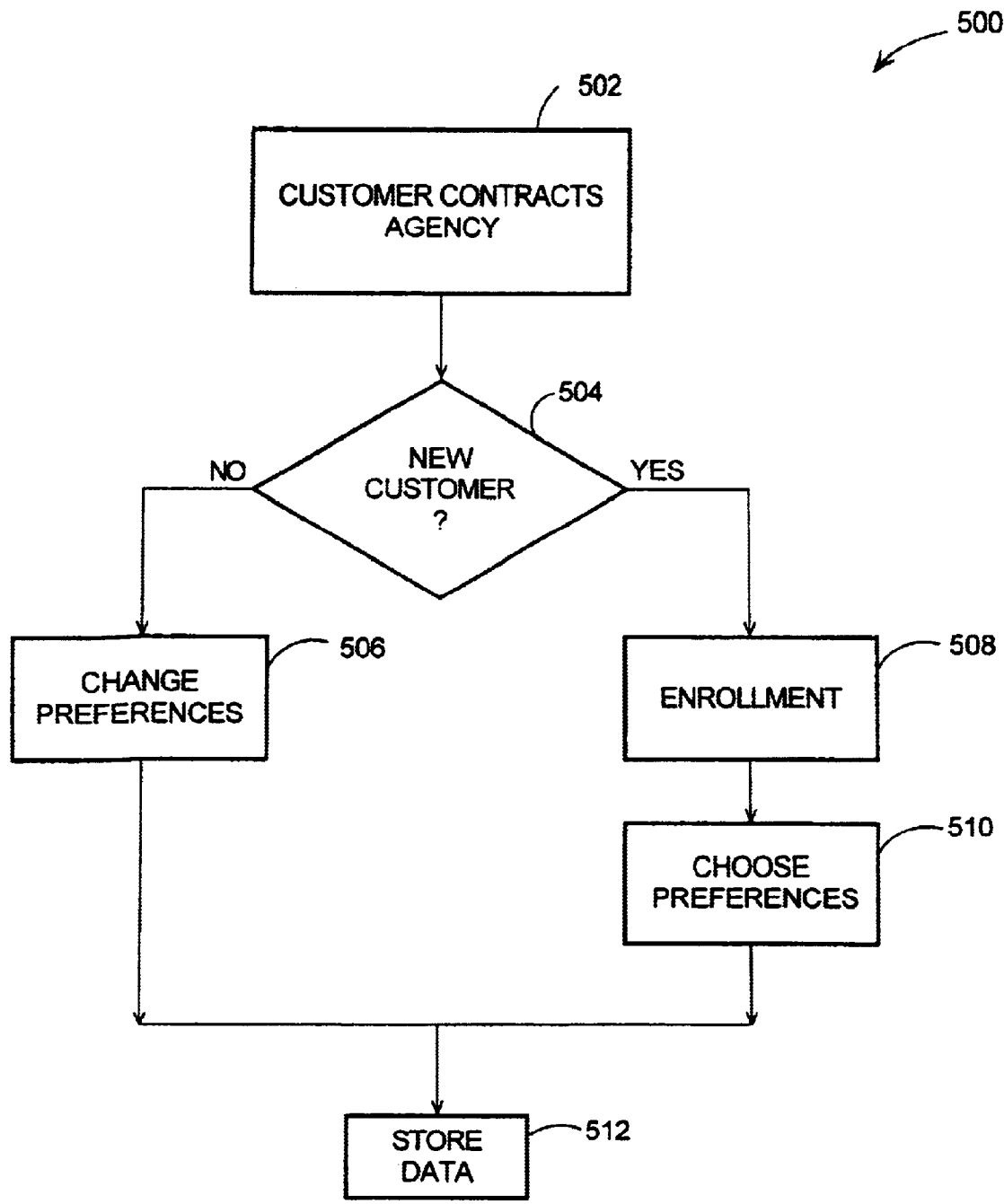
FIG. 5 is a flowchart of an operational sequence for establishing and reconfiguring a customer account according to the invention.

FIG. 5 shows a sequence 500 that illustrates the operations of enrolling and/or reconfiguring a customer account. Completion of customer enrollment is necessary for the customer to subsequently receive customized audio information from the system 100, as shown below.

For ease of explanation, but without any intended limitation, the example of FIG. 5 is described in the context of the hardware environment of FIG. 1, as described above. In step 502, a customer contacts the information delivery agency ("agency"). This customer is referred to as the "current" customer. As illustrated in FIG. 1, contact may be achieved by the customer's use of a personal computer to contact the account server 164. More particularly, the customer's computer utilizes the Internet 102 to interact with the web page presented by the account server 164. Alternatively, the customer 110 may access a telephone or other automated system, or even communicate with human operators of the agency by telephone voice connection, postal service, facsimile, or another appropriate mode of communication. For ease of explanation, the remaining operations are discussed in the context of a completely automated embodiment, wherein the customer utilizes a personal computer to interact with the account server's web page.

In step 504, the account server 164 consults the customer database 155 to determine whether the current customer is new to the system 100. This may be achieved, for example, by facilitating a log-in process for existing customers and a "set up new account" option for new customers. If the customer is new, the account server 164 proceeds to setup a new account for the current customer in step 508. Step 508 is referred to as "enrollment," which may be conducted as described in the above-mentioned '472 application. Broadly, the enrollment operations are performed by the account server 164 as it interacts with a customer 110, which may occur via the public Internet in one example. For instance, where the customer 110 is utilizing a computer, interaction between the account server 164 and customer 110 occurs by means of a graphical user interface (GUI) provided by the account server 164. Enrollment involves reading, completing, and updating the log-in statistics 185, which comprise information for each customer such as the following: (1) the customer's name, (2) a "designated" phone number selected by the customer to speed future log-in by automatically recognizing the caller by "caller-ID" or "ANI," for instance, (3) a unique "User-ID" for the customer, assigned by the account server 164, (4) a personal identification number (PIN) chosen by the customer, (5) whether the customer desires to use PIN-free login or not, and (6) any other desired preferences.

After enrollment, the account server 164 prompts, permits, or otherwise enables the customer to construct a list of preferences 183 regarding future delivery of audio information to the customer (step 510). In addition to "content preferences," which specify the type of information for playback, the account server 164 may solicit various "playback preferences" such as playback order, playback language, playback voice type, playback speed, playback volume, etc. Although step 510 (and step 506, discussed below) may be implemented in various ways, the account server 164 may advantageously use a GUI including features such as check-boxes, radio buttons, pull-down menus, and the like.

In contrast to the foregoing description, if step 504 finds that the current customer is not new, step 504 leads to step 506. In step 506, the account server 164 permits the customer to change his/her existing preferences 183, as discussed in greater detail below. Following step 506 (or step 510), step 512 stores the customer's new preferences in the customer database 155, completing the sequence 500.

Customer Preferences

As mentioned above, the routine 500 assists customers in initially establishing and later reconfiguring respective "preferences" that govern future delivery of audio information. Unlike the universally pre-downloaded "channels" and "topics" that pertain to predefined areas of subject matter, customers' preferences help the system 100 identify data for presentation to each individual customer during "playback." As mentioned above, customer preferences include content preferences and playback preferences. The customers' preferences 183 are stored in the customer database 155, mentioned above.

In the subject matter of each channel, the account server 164 is programmed to recognize certain "topics" and various deeper layers called "stories" that are available for inclusion in customers' content preferences. When the account server 164 assists the customer in establishing (step 510) or changing (step 506) the customer's preferences, use of the channels, topics, and stories permits customers to carefully tailor their content preferences to their own interests. Thus, the content preferences portion of the preferences 183 includes indicia identifying customer's preferred channels, topics, etc. Each channel may be identified by a unique code ("channel ID") assigned to that channel to distinguish it from other channels. Likewise, each topic may be identified by a unique code ("topic ID") assigned to that topic to distinguish it from other topics. Along these lines, if stories are implemented, story IDs may be employed as well.

An exemplary list of topics under the channel "traffic" may include, for example, all major U.S. cities. Under the topic of a given city, suitable stories may comprise areas of the city, freeways, traffic centers, highway intersections, etc. As another example, the "sports" channel may include topics such as "teams" (with different sports teams providing the stories) and "league summaries" (with different sports providing the stories). In step 510, the customer chooses the channels, topics, and stories of interest to him/her.

To further illustrate the relationship of channels and segments, TABLE 1 (below) shows an exemplary listing of a customer's content preferences.

TABLE 1

EXEMPLARY CUSTOMER PREFERENCE LISTING

Channel 1 - TRAFFIC

| (Topic) | (Story) North County |
|---|---|
| San Diego, CA | (Story) South County |
| | (Sub- segment:) East County |

TABLE 1-continued

EXEMPLARY CUSTOMER PREFERENCE LISTING

| (Topic) | (Story) I.H. 10 |
|---|---|
| Houston, TX | (Story) I.H. 35 |
| . . . | . . . |

Channel 2 - NEWS (Stories) Wall Street Journal Hourly Report
(Stories) Headline News
. . .

Channel 3 - FINANCIAL TICKER (Stories) ˆDJI, ˆIXIC, ˆSPC, MOT
Channel 4 - ENTERTAINMENT

| (Topic) Movie Listings | (Sub-Topic) San Diego | La Jolla 3 AMC Mission Valley 12 Kensington |
|---|---|---|
| | Santee | Santee Drive-In |
| | Carlsbad | Carlsbad 12 |
| | . . . | . . . |
| (Topic) Television Listings | San Diego Stations | Channel 1 Channel 2 Channel 3 |
| . . . | . . . | . . . |

Channel 5 - SPORTS

| (Topic) Teams | San Diego Chargers Chicago Bears Minnesota Twins |
|---|---|
| (Topic) League Summaries | Football Hockey W.W.F. |
| . . . | |

Channel 6 - WEATHER

. . .
San Diego
San Francisco
San Jose
. . .

Channel 7 - HOROSCOPE

Aries
Taurus
Gemini
Cancer
Leo
Virgo
Libra
. . .

In addition to channels and topics as discussed above ("content preferences"), customer preferences 183 may also include various specifications about the manner of playback ("playback preferences"). Some exemplary playback preferences include:

1) a preference not to play stories that have been played during previous calls.
2) an "experienced" user preference to skip playing of instructional material, menu headings, and the like.
3) a specified order of channel playback.
4) whether the caller wishes to conduct playlist navigation using voice utterances (e.g., "skip") or using telephone keypad entries (e.g., "#").
5) whether to set PIN security "on" or "off."
6) whether to start in "dialog" mode, for content surfing. By default, playback begins in a playlist mode. In dialing mode, a user can navigate a large hierarchy of audio content using voice commands.

Playback Session

Figure 6:
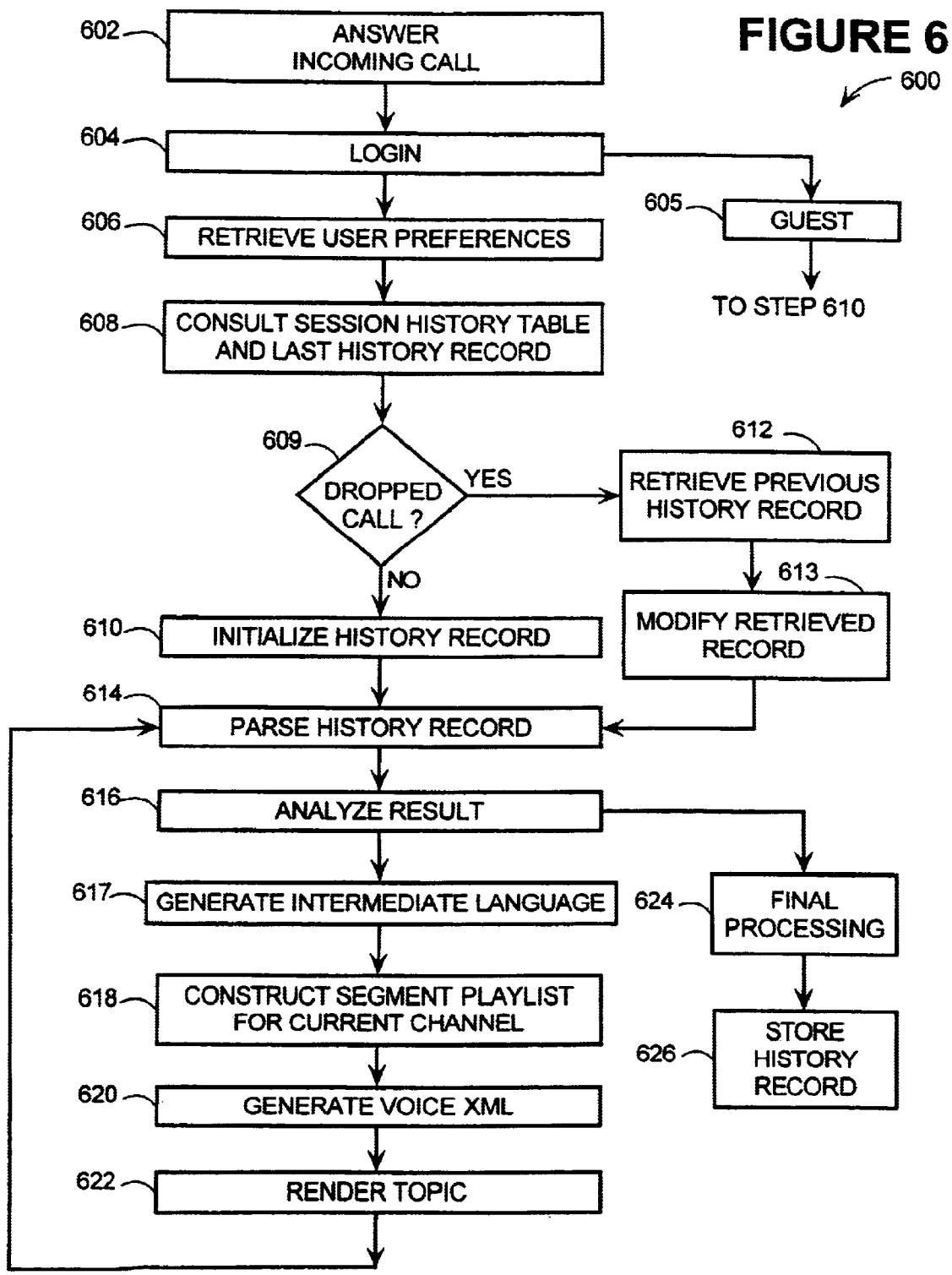
FIG. 6 is a flowchart showing a detailed example of operational sequence for conducting a playback session according to the invention.
Figure 7:
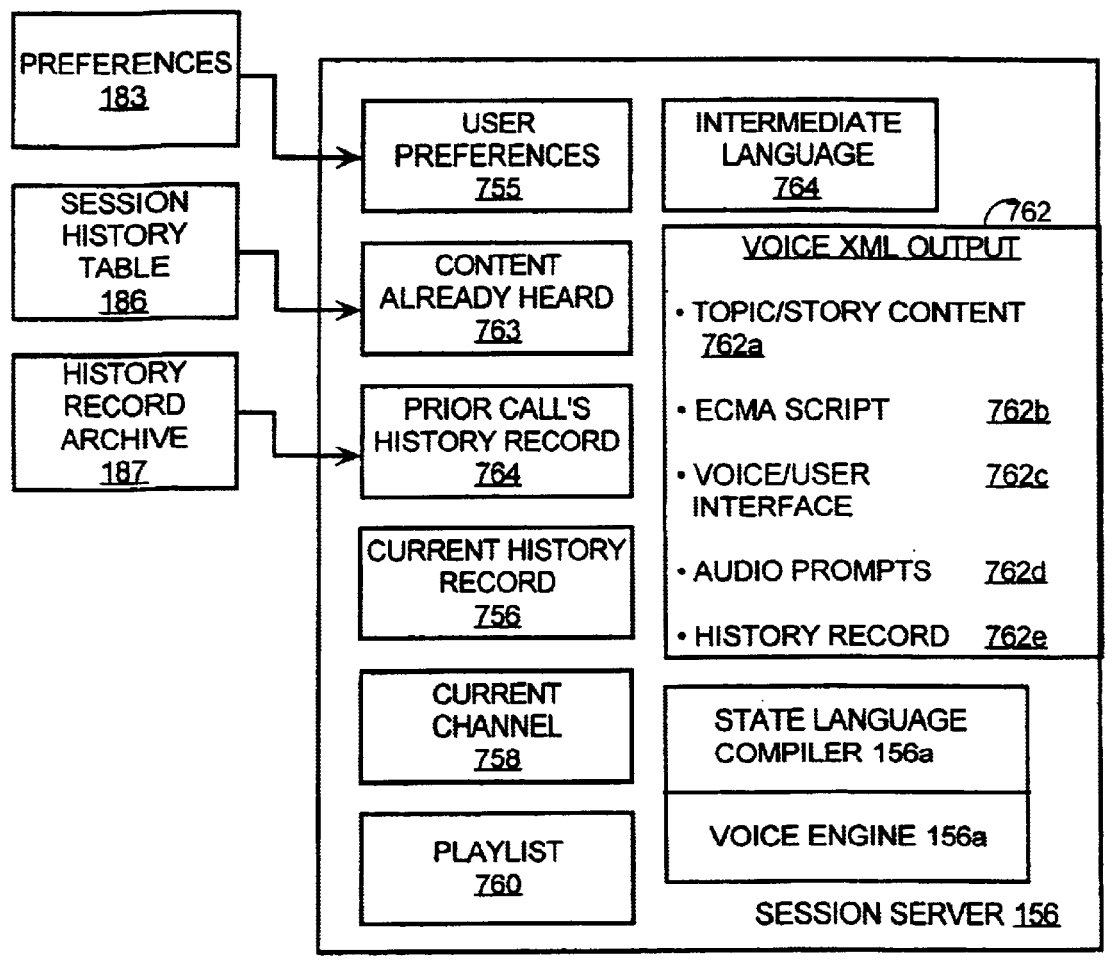
FIG. 7 is a diagram showing various data items assembled and/or used by the session server during a playback session, according to the invention.

FIG. 6 shows a sequence 600 showing the operation of the session server 156 and telephony server 158 during a customer-initiated "playback session." FIG. 7 provides a diagram of different data items assembled and/or used by the session server 156 during performance of the sequence 600. For greatest access speed, the data of FIG. 7 may be assembled in memory of the session server 156, for example.

Broadly, the playback session involves the system 100 retrieving the customer's pre-stored content preferences and proceeding to identify information already present in the universal database 152 that pertains to those particular content preferences. Also, after preparing vocalizations of text information where needed, agency equipment audibly presents the audio information and vocalizations to the customer in predetermined order via the customer's telephone connection. The order and manner of presentation is dictated by the caller's playback preferences. Playback is achieved by using the intermediate telephone network 106.

More particularly, the playback sequence 600 is initiated when a customer places a telephone call to the system 100 from a telephone 104 (step 602). The telephony server 158 receives the customer's call, and notifies the session server 156, which may occur by the telephony server 158 sending an appropriate request. Although land line phones may be used, step 602 may be conveniently initiated by the customer from a wireless telephone while the customer is driving, walking, or otherwise away from a computer. In step 604, the session server 156 conducts a log-in operation, verifying that the caller is an enrolled customer. Broadly, step 604 determines the customer's designated telephone number, and verifies the customer's PIN (if necessary). The session server 156 may expedite the log-in process if the number of the customer's telephone 104 appears in the log-in statistics 185, and may further expedite the process if the customer has chosen to set "PIN security" as "OFF" as explained in the '472 patent mentioned above. As part of step 604, the session server 156 consults the log-in statistics 185 to determine the caller's User-ID. This operation may also be implemented as shown in the above-captioned '472 application.

If log-in fails, the session server 156 may end the call. Alternatively, the session server 156 may provide guest mode services (step 605) by requesting the caller's zip code and then proceeding to construct and render a playlist appropriate to that zip code, instead of using any user preferences. In this event, the guest services 605 are performed in lieu of the remaining steps 608–626, wherein an anonymous query/response menu-based system is used. An alternative approach is to generate a "fake" history record in step 605 and then proceed to process the call in the same way as for enrolled callers.

If log-in 604 succeeds, step 604 advances to step 606, where the session server indexes the preferences 183 by the caller's User-ID to obtain the content preferences particular to the caller. As explained above, these preferences include the channels and topics of interest to the caller (content preferences), and may include other information such as a preference to skip topics heard during previous calls, etc. (i.e., playback preferences). For visual illustration, FIG. 7 shows the caller's preferences 755 after retrieval by the session server 156 in step 606. After step 606, the session server 156 consults the session history table 186 to identify content of the database 152 that the customer has already heard (step 608, FIG. 6). TABLE 2, below, shows an excerpt from an exemplary session history table 186.

TABLE 2

| USER ID | STORY ID(s) |
|---------|-------------|
| 123456 | 55769, 54188, 55695, 54184 |
| 923457 | 55769, 54189 |
| 330989 | 55769, 54188, 55691, 54181 |
| 220908 | none |
| 787790 | 54100 |
| . . . | . . . |

Although the invention contemplates different implementations, the exemplified session table 186 cross-reference each customer's User-ID with all stories that the customer has previously listened-to. As shown, each story is identified by a "story-ID," which is a unique numerical code assigned to that story to distinguish it from other stories. The table 186 may be occasionally groomed by the content processor 160 to limit table contents to stories still present in the universal database 152, or to apply another criteria such as deleting stories of a predetermined age, etc. For visual illustration, FIG. 7 shows the caller's previously heard content 763 after retrieval by the session server 156.

Also in step 608 (FIG. 6), the session server 156 retrieves the history record for the caller's previous call from the history record archive 187. Generally, each history record contains codes representing the events of the call, such as which content was played to the user, how the user navigated through his/her channels and stories, etc. The contents and use of history records are shown in greater detail below. FIG. 7 depicts the caller's prior call history record as 764.

After step 608, the session server 156 in step 609 consults the retrieved history record 764 (FIG. 7) to determine whether the customer's previous call was especially recent, such as within fifteen minutes or another predetermined time period. If so, step 609 asks the user if s/he would like to continue where s/he left off, and if so (or assuming so, as a default), step 609 takes takes action to resume call playback from the point of loss. Namely, the session server advances to step 612, where the session server adopts the previous history record 764 instead of initiating a new history record for the present call. The previous history record thus becomes the "current" history record 756, and in this sense, the old history record helps to maintain state "across" different calls. If desired, the previous history record may be modified in step 613 (such as by truncation) to ensure that the playback is ultimately conducted to place the customer back in a desired state of call progress. After step 613, the routine 600 continues as described below.

In contrast, if step 609 finds that the customer's last call was not dropped, step 609 advances to step 610, where the session server prepares a new history record for the current call. This history record thus becomes the "current" history record, depicted by 756 in FIG. 7. As one example, the newly initialized history 756 record may contain the following elements:

1) The channels to which the user subscribes, in the user's preferred order of presentation. This information is available from the caller's user preferences 755.
2) The customer's User ID, available as a result of step 604.
3) Whether this is a new call, or resumption of a previous call, available from step 609.

Also, whether the user successfully logged-in, and if not, an indication that the call is conducted in "guest" mode.

4) Whether the telephony server 158 should solicit/receive user input in the form of voice utterances, telephone keypad entries, or both, as determined from the caller's user preferences 755.

After step 610, the session server directs the state compiler 156a to parse the current history record 756 from start to finish (step 614). The state compiler 156a responds by analyzing the history record, entry by entry, to determine the recent events, progress, and other attributes determining the context of how the call has progressed and the present state of the call. In other words, the state compiler 156a determines a final "state" of audio playback by parsing and analyzing all the entries in the history record 756. After step 614, the state compiler 156a analyzes the result of step 614, and takes appropriate action (step 616). Broadly, step 616 entails the state language compiler 156a identifying all future actions that may possibly occur based on the previously identified current state. As a more specific example, this may be achieved by the state compiler 156a cross-referencing the current state (and, optionally, any user preference) in an array of possible current states indexed against all possible actions therefrom to show the resulting new states.

The array 900 of FIGS. 9A–9D constitutes one example. In this example, the column heading represents various predetermined states, whereas the third and subsequent row headings represent recognized user commands that cause playback state transitions. The contents of the table 900 represent the new states that are entered upon issuance of commands in the corresponding row headings. One advantage of using the table 900 is that the overall voice interface may be conveniently changed by substituting or otherwise changing the placement and identify of commands in this table.

Step 616, then, determines all possible future actions based on the current state and the user commands that are appropriate at that time. One result of step 616 is that the state compiler 156a uses the parsed current history record to identify the current channel to be played. For visual illustration, FIG. 7 shows the identified current channel as 758. Optionally, the state language compiler 156a may consider whether the caller's user preferences 755 include a preference not to receive playback of content that has already been played to that caller. If so, step 616 may skip from the current channel to the next channel, if the caller has previously listened to all topics of the current channel according to the listing of content already heard 763.

In step 617, the state language compiler 156a generates certain "intermediate" language. In one option, the intermediate language comprises a set of name-value pairs that uniquely describe the current state. The intermediate language comprises a set of variables and variable values that function to instruct the VoiceXML generator what to output. FIG. 7 shows the intermediate language as 764. The following provides one example of a history string and its counterpart name-value pair set. The history string is given by:

"tio,4,8,6,2,10,7,9,12,1,5,3,11;beg,0,start;def,no;rec, vox;top,T988409499890,4;seg, T988409499906, sysprompt;seg ,T988409506140,earcon; nav, T98840950892 1, menu interactive."

The name-value pair set is given by:

"ThisContext=17,-3,0&playmode=2&defaultmode= 0&startmode=0&dtmf=0&dtmf=0&playthroughtopic= 4&playthroughsegment=0&is_dtmf_toggle= 0&dtmf_counter=0&is_restart=0&restart_counter= 0&interactive_is_playlist=0&ddl_state=".

This set constitutes language designed for receipt and processing by an embodiment of voice engine 156b that comprises a Perl script execution engine.

After step 617, the voice engine 156b employs the intermediate language to construct a topic and story playlist for the current channel (step 618). By generating the playlist one channel at a time (instead of all channels together), this provides an advantage of starting caller playback with minimal delay, and saves processing time in the event the caller hangs up before listening to content of all channels. Another advantage of this approach is the preservation of content freshness, especially for rapidly changing content. The playlist comprises a list of all topics and/or stories, identified by topic ID or story ID and pertaining to the current channel, that are appropriate for playback to the caller. Thus, these topics and stories comprise all topics/stories available in the database 152 that satisfy the customer's content preferences. The listing of topics/stories is ordered in accordance with the customers preferences (if any) as to order. FIG. 7 depicts the playlist as 760. Optionally, the voice engine 156b may consider whether the user preferences 755 include a preference not to receive playback of content that has already been heard, and if so, step 617 may omit from the playlist 760 any topic/segments previously played to the caller (as identified by the listing of content already heard 763).

In step 620, the voice engine 156b utilizes its topic/story playlist to generate a VoiceXML module based upon the intermediate language of step 618. In the illustrated example, the voice engine 156b prepares its output by completing a template VoiceXML document that calls various pre-prepared handlers associated with various functions. Optionally, steps 618, 620 may be combined, although shown separately herein for clarity of illustration. FIG. 7 shows the VoiceXML output as 762. The VoiceXML output includes a complete listing of code executable by the telephony server 158 to conduct an interactive playback session with the caller, pertaining to the current channel. More particularly, the VoiceXML module contains VoiceXML programming containing:

1) Pointers to topic and story content 762a corresponding to the current playlist 760. This content includes media such as text and audio files, or pointers such as Uniform Resource Locators (URLs) identifying such content in the database 152. Some more particular examples include digital audio files in WAV, VOX, AUD, MP3, RA, PCM, or other format or protocol, and text stories in suitable brevity, content, detail, and other format for rendering in audio form to cellular or other customers. Assembly of the content pointers 762a is conducted by the voice engine 156b retrieving the content from the universal database 152.

2) Code executable by the telephony server 158 to maintain and update the history record 756 for the present call, which in one example comprises European Computer Manufacturers' Association (ECMA) script 762b.

3) A voice-user interface 762c comprising cues, content, grammars, actions to take in reaction to user commands, and the like.

4) Prompts 762d applicable to the current caller's playlist. Such prompts include voice prompts, audible icons ("earcons"), and the like, or pointers to prompts 189 in the storage 150.

5) The current history record 756, shown in the VoiceXML output 762 as 762e.

In step 622, the session server 156 hands the VoiceXML output 762 to the telephony server 158, which proceeds to conduct an interactive playback session with the caller. The telephony server's execution of the VoiceXML output 762 is conducted to render the content 762a to the caller, for example, by processing digital audio files to transmit the digitally represented sounds to the customer's telephone 104, and synthesizing text data by using a computer voice synthesizer to pronounce the text. The telephony server 158 retrieves content (as necessary) from the database 152 according to the content pointers 762a. In an exemplary embodiment, the order of processing the VoiceXML output 762 is from top to bottom. During step 622, the voice/user interface 762c assists the caller in "navigating" his/her playlist. Also during step 622, the telephony server 158 conducts handshaking with the session server 156 as needed to request a VoiceXML file be created for a particular user containing a specific audio channel.

During step 622, the telephony server 158 executes the VoiceXML module's ECMA script 762b. This causes the telephony server 158 to update the history record 762e in accordance with events that occur during the call. Some exemplary conditions or events that merit inclusion in the history record 762e, as dictated by the ECMA script, include:

1) Which topics and stories were rendered by the telephony server 158 to the caller.
   Such topics/stories may be identified, for example, by topic/segment ID.
2) Which audio prompts (such as "earcons" and cues) were played to the caller.
3) What utterances or keypad commands the caller entered to navigate his/her playlist.
4) "Misrecognitions," which comprise user utterances that do not match words in the grammar.
5) Errors experienced by the telephony server 158, such as (1) "unable to fetch audio file", (2) "session server did not respond", (3) "telephony server experienced an exception", etc.
6) "State changes," meaning generation of a new VoiceXML file, change from voice to touch tone mode, pause, help, un-pause, etc.
7) Time stamps for relevant occurrences such as any of the above.

Thus, as shown above, the telephony server 158 uses the VoiceXML output 762 to maintain state within the call. Step 622 ends when the telephony server 158 finishes playing the current channel, or when the user interrupts the normal playback by entering a voice or keypad command. After each completion of step 622, the telephony server 158 returns the VoiceXML output 762 including the history record 762e, (as updated during playback by the ECMA script 762b of the VoiceXML output 762) to the voice engine 158b, whereupon the voice engine 156b updates the contents of the current history record 756 to reflect the updated history record 762e.

After completion of step 622, processing of the current channel is done. Accordingly, the session server 156 proceeds to parse the current history record (step 614) and then analyze the result (step 616). When the current history string is analyzed in step 616, the session server 156 recognizes that the playback must now proceed to a new channel, and appropriately begins constructing the segment playlist for that channel in step 617. The remaining steps 618, 620, 622 are then performed using this channel as the "current" channel.

When the analysis step 616 reveals that all channels have been rendered, if the caller wishes to hang up or says goodbye, the voice engine 156b proceeds to steps 624, 626 for final processing. In step 624, the voice engine 156b updates the session history table 186 to list the topics/stories played to the caller in the current call. Then, in step 626, the voice engine 156b stores the history record 756 in the archive 187 for future reference. In contrast, if all channels have been rendered but the caller does not hang up or say goodbye, the step 616 may start the process of rendering channels anew.

History Records—Description of Content

The following description provides a more detailed explanation of the contents, meaning, and construction of an exemplary history record. As mentioned above, history records track various events during calls, and also help to maintain state across calls because the previous history record 764 (FIG. 7) can be recalled from the history record archive 187 to resume when the caller calls back after experiencing a dropped call.

TABLES 3–4 (below) illustrate an exemplary list of vocabulary terms that are used when constructing and analyzing history records. TABLE 3 depicts vocabulary terms that are used in a header of new history records (step 610), this header preceding other information about the events occurring during a playback session. TABLE 4 depicts vocabulary terms that are used to describe the events during playback, such as which segments are played, which user inputs are received, etc.

TABLE 3

| PARAMETER | EXPLANATION |
| --- | --- |
| tio | "topics in order" - has value of a string of topics that the customer subscribes to, according to the customer's preferences 183; "7,3,4,6,11,7,2,10" is one example of this string; in this example, the "7" is metadata representing count of the topic IDs, and the ensuing topic IDs are listed as follows: traffic (3), news (4), financial news (6), entertainment (11), sports (7), weather (2), and horoscopes (10) |
| beg | "begin mode", i.e., start, restart |
| start | signifies a new call (rather than a resumed call) as determined by step 609 |
| restart | signifies the current call is a resumption of a dropped call, as found by step 609 |
| def | default if "def" equals "yes", then the caller properly completed login 604, and the stored preferences 183 can be used if "def" equals "no", then the caller did not login 604 properly, and the session server 156 uses a guest mode 605 without using any specific user preferences |
| rec | user response mode (recognition) if "rec" equals "vox", then the caller session server 156 receives the caller's input in the form of voice utterances if "rec" equals "dtmf," then the session server 156 receives the caller's input in the form of telephone keypad entries |
| a counting number (integer), e.g. 2570 | call ID (number used to identify the call) |

TABLE 4

| PARAMETER | EXPLANATION |
| --- | --- |
| top (topic) | began playback of channel; "top" may have the value of a timestamp and the Channel ID. |
| seg (segment) | begin playback of a segment; "seg" may have the value comprising the identify of: a predetermined sound, such as "start" (meaning a start music sequence) or other queue 189 |

TABLE 4-continued

| PARAMETER | EXPLANATION |
|---|---|
| | or "ear" (meaning an earcon) a content segment, identified by its segment ID |
| nav (navigation) | the user entered a command such as a voice utterance or keypad entry; "nav" has a value of a timestamp when the event occurred, and the subject command |
| bot (bottom) | playback of the current channel completed |

Having described the vocabulary of TABLES 3–4, an excerpt of an exemplary history record appears in TABLE 5, below. The history record reads sequentially from left to right, and top to bottom like text on a page.

TABLE 5

| PARAMETER | EXPLANATION |
|---|---|
| tio,10,6,1,2,4,7, 5,11,8,10,9 | "channels in order" according to these channel ID's |
| beg,2570,start; | Begin a regular call (start, as opposed to restore for a continued call) with a call ID of 2570 in the universal database 152. |
| def,no; | Default mode = no. Default mode = no means use a personalized playback, instead of going into directed dialog only mode. |
| rec,vox; | Start in voice recognition mode. "rec,dtmf" means start in DTMF mode. |
| top,967408980015,6; | Enter channel 6 (weather). the number in the middle is a Unix epoch timestamp in milliseconds (number of milliseconds since Jan. 1, 1970). |
| seg,start; | Enter a segment, in this case "start" -- the message that says welcome to Indicast. |
| seg,ear; | Enter a segment, in this case the earcon for weather |
| seg,967409000865,1,54536; | Enter the first story (1) with a story ID in the database of 54536 at the given timestamp (96740900865) Alternatively, database-independent codes may be used instead of database-specific ID's for the given story. |
| nav,967409024409,next; | User issued the command "next" at the given time index |
| seg,967409024679,2,55691; | Enter the second story (2) with a database story ID of 55691 at the given time index (967409024679). |
| seg,987409084958,3,55894; | Enter the third story (3) with a database story ID of 55694 at the given time index. |
| bot,967409145022,6; | Fall out of the bottom of the weather channel. This implies that the user gave no input while listening to the last segment. |
| top,967409147866,1; | Enter channel 1 (traffic) at the given time index. |
| seg,ear; | Earcon for traffic |
| seg,967409150470,1; | First traffic segment and time index. |
| seg,967409153765,2; | Second traffic segment and time index. |
| bot,967409165482,1; | User went off the end of the traffic channel at the given time. |
| top,967409167445,2; | Enter channel 2 (news) at the given time index. |
| seg,ear; | Earcon for news. |
| seg,967409171310,1; | Enter first news story. |
| nav,967409213661,next; | Use issued next command at the given time. |
| seg,967409213871,2; | Enter second news story. |
| nav,967409220571,next2next; | User issued next command but was at the end of the news stories, so go into the next channel in order (i.e., channels, financial ticker). |
| top,967409221973,4; | Enter News financial ticker. |
| seg,ear; | Earcon for financial ticker. |
| seg,967409225538,1,55764; | First financial ticker. |
| nav,967409247520,next2next; | User said "next" but was already at the |

TABLE 5-continued

| PARAMETER | EXPLANATION |
|---|---|
| | end of all financial ticker stories for their Indicast, go into next channel in order (i.e., channel 4, entertainment). |
| top,967409250414,7; | Time index for entering entertainment. |
| seg,ear; | Earcon for entertainment. |
| seg,967409253458,1,55769; | User heard first entertainment report at time index with given story ID. |
| bot,96740937b364,7; | User reached the end of entertainment at time index. |
| top,967409378037,5; | Enter channel 5 (Sports). |
| seg,ear; | Earcon for sports |
| seg,967409381402,1,53781; | Enter first segment in sports at time index with given story ID. |
| . . . and so on . . . | . . . |

History Records—Description of Use

Aside from their use across-calls to keep track of which channels have been played to the caller, and their use within calls to keep track of which segments have been played, history records also have a number of "downstream" uses because of the detailed information they contain about customer's calls. FIG. 8 depicts a sequence 800 showing some exemplary downstream uses for history records. In step 802, history records of interest are retrieved from the history record archive 187. As one example, step 802 may be conducted by an administrator using a terminal, computer, or other interface device to access the customer database 155. Alternatively, step 802 may involve access by another party such as a developer seeking to find a coding error, a statistician analyzing call patterns using a desktop computer, etc.

After step 802, programmers or other technicians may analyze the retrieved history records (step 804) in order to debug, improve, or otherwise modify components of the system 100 (step 806). As an alternative or additional use, step 808 may be performed after step 802 to manually or automatically assemble, reformat, sum, compile, dissect, or otherwise process history records from one or more customers for the purpose of preparing a representative report. This report may contain different information depending upon the ultimate use of the report, as discussed below.

In one example, the step 808 report summarizes the number of minutes (or other time measure) that information from a particular content provider 108 has been played to customers, in which case the report is transmitted to "upstream" content providers 108 (step 810). This report may be transmitted manually (by an administrator, for example) or automatically (by a processor coupled to the storage 150). Such a report may be useful to content providers for billing purposes, in the event they charge the operator of the system 100 based on minutes of playtime.

In a different example, a different step 808 report may be used by the information delivery agency to sell, share, or otherwise dispose of customer content access statistics information to downstream consumers such as those conducting data mining, market studies, and the like (step 812). Such statistics may include the content favored by callers, and the length of time such content was accessed. This information may also be used to target advertisements to callers according to their particular interests, perform data mining, etc.

In still another example, a different variety of step 808 report may be used by the information delivery agency to conduct customer service tasks (step 814). For instance, the session server 156 may be manually or automatically updated to achieve progressive adaptation or refinement.

More particularly, a system administrator or the session server 156 itself may recognize (step 814) that a particular caller always skips into the sports channel after the first weather segment; accordingly, the system 100 may update the caller's preferences 183 or store a separate annotation to the caller's preferences, such that future playback automatically incorporates this step. As a different example, the system administrator or session server 156 may recognize a caller's familiarity and comfort with the telephony server 158, such as due to a caller's frequency of access, and appropriately incorporate a more streamlined voice/user interface 762c that omits extraneous help/tips, omits some explanatory prompts, etc.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present is invention contemplates various changes beyond such specific order.

What is claimed is:

1. A method of rendering personalized audio content to telephone callers, comprising operations of:

assembling a universal database by gathering information content concerning predefined channels from content suppliers;

receiving customer content preferences specifying items comprising, for each customer, one or more desired channels; and responsive to receiving an incoming call from a telephone caller, performing the following operations during the call:

retrieving the caller's content preferences including the specified channels;

establishing a history record for the incoming call; and conducting a playback session comprising operations of:

identifying content from the universal database that satisfied the retrieved content preferences;

retrieving the identified content from the database;

according to a predetermined order, audibly presenting the retrieved content to the caller via the caller's telephone connection;

expanding the history record by appending data comprising;

identification of predetermined types of events occurring during the telephone call including instructions from the caller and audible presentation of information to the caller;

time stamps of events occurring during the call: and analyzing the history record using a state language compiler programmed to analyze history records to determine a state of progress of audio playback represented thereby.

2. The method of claim 1, where:

the operation of conducting said playback session further comprises varying one or more aspects of said playback session by varying audible output transmitted to a customer's telephone;

the operation of expanding the history record is conducted such that predetermined types of events occurring during the telephone call include at least one of the following: which segments are played and which user inputs are received.

3. The method of claim 1, the operations further comprising:

noting any content presented to the caller during one or more previous playback sessions;

omitting the noted content from the playback session.

4. The method of claim 3, where:

the operations further comprise retrieving playback preferences of the caller including a preference for whether to skip already-played content;

the omitting of the noted content being selectively performed only if the user's playback preferences indicate a preference to skip already-played content.

5. The method of claim 1, where the operations responsive to receiving an incoming telephone call further comprising consulting a history record for the caller's previous incoming call to determine whether the previous call occurred within a prescribed time period, and if so, consulting the history record to identify content presented to the caller during the previous call and omitting said content from the playback session.

6. The method of claim 1, where the operations responsive to receiving an incoming telephone call further comprise consulting a history record for a caller's previous incoming call to determine whether the previous call occurred within a prescribed time period, and if not, the operations of establishing a history record for the incoming call comprising initializing a new history record.

7. The method of claim 1, where the operation of conducting the playback session comprises:

identifying content from the universal database that satisfies the retrieved content preferences;

constructing at least one VoiceXML source file containing representations of the identified content;

executing the source file to retrieve the identified content from the database and audibly present the retrieved content to the caller via the caller's telephone connection according to a predetermined order;

expanding the history record.

8. The method of claim 1, further comprising constructing a VoiceXML source file, wherein construction the VoiceXML source file further comprises preparing code executable to perform the operation of expanding the history record.

9. The method of claim 1, the operation of expanding the history record being conducted such that data appended to the history record comprises at least one of the following:

errors occurring during the playback session;

misrecognitions;

voice commands submitted by the caller;

keypad commands entered by the caller;

identity of content presented to the caller.

10. The method of claim 1, where:

the establishing of a history record for the incoming call comprises utilizing the content preferences to prepare a listing of specified channels and a channel presentation order;

the operation of conducting the playback session comprises:

identifying content from the universal database that satisfies the retrieved content preferences as to a first one of the channels;

constructing at least one VoiceXML source file containing a representation of identified content;

executing the source file to retrieve the identified content from the database and audibly present the retrieved content to the caller according to a predetermined order;

expanding the history record;

repeating the following operation for each un-presented channel:

referencing the history record to identify a next channel for presentation, identifying content from the universal database that satisfies the retrieved content preferences as to the next channel, and repeating the constructing, executing, and expanding operations for the next channel.

11. The method of claim 1, the operations further comprising:

consulting one or more history records to determine times of presenting retrieved content to one or more callers and preparing a representative play-time output report.

12. The method of claim 1, the operations further comprising:

employing one or more history records as input to determine a source of errors occurring in one or more playback sessions.

13. A signal-bearing medium tangibly embodying one or more programs of machine-readable instructions executable by one or more digital processing apparatuses to perform operations for rendering personalized audio content to telephone callers, the operations comprising:

assembling a universal database by gathering information content concerning predefined channels from content suppliers.

receiving customer content preferences specifying items comprising, for each customer, one or more desired channels; and responsive to receiving an incoming call from a telephone caller, performing the following operations during the call:

retrieving the caller's content preferences including the specified channels;

establishing a history record for the incoming call; and conducting a playback session comprising operations of:

identifying content from the universal database that satisfies the retrieved content preferences;

retrieving the identified content from the database;

according to a predetermined order, audibly presenting the retrieved content to the caller via the caller's telephone connection; and expanding the history record by appending data comprising:

identification of predetermined types of events occurring during the telephone call including instructions from the caller and audible presentation of information to the caller;

time stamps of events occurring during the call; and a state language compiler programmed to analyze history records to determine a state of progress of audio playback represented thereby.

14. An audio information delivery apparatus, comprising:

a content processor programmed to assemble a universal database by gathering information content concerning predefined channels from content suppliers;

an account server programmed to receive customer content preferences specifying items comprising, for each customer, one or more desired channels from a predefined list of channels; and a session server, programmed to perform operations responsive to receiving an incoming call from a telephone caller, said operations comprising:

retrieving the caller's content preferences including the specified channels;

establishing a history record for the incoming call; and conducting a playback session comprising operations of:

identifying content from the universal database that satisfies the retrieved content preferences;

retrieving the identified content from the database;

issuing instructions for a voice engine to audibly present the retrieved content according to a predetermined order to the caller; and providing direction for the voice engine to expand the history record by appending data comprising:

identification of predetermined types of events occurring during the telephone call including instructions from the caller and audible presentation of information to the caller;

time stamps of events occurring during the call; and a state language compiler programmed to analyze history records to determine a state of progress of audio playback represented thereby.

15. The apparatus of claim 14, further comprising: voice engine.

16. An audio information delivery apparatus, comprising:

content processor means for assembling a universal database by gathering information content concerning predefined channels from content suppliers;

account server means for receiving customer content preferences specifying items comprising, for each customer, one or more desired channels from a predefined list of channels; and session server means responsive to receiving an incoming call from a telephone caller for:

retrieving the caller's content preferences including the specified channels; and establishing a history record for the incoming call; and conducting a playback session comprising operations of:

identifying content from the universal database that satisfies the retrieved content preferences;

retrieving the identified content from the database;

issuing instructions for a voice engine to audibly present the retrieved content to the caller according to a predetermined order; and providing direction for the voice engine to expand the history record by appending data comprising:

identification of predetermined types of events occurring during the telephone call including instructions from the caller and audible presentation of information to the caller;

time stamps of events occurring during the call; and a state language compiler programmed to analyze history records to determine a state of progress of audio playback represented thereby.

* * * * *